United States Patent
Desai et al.

(10) Patent No.: US 10,805,906 B2
(45) Date of Patent: Oct. 13, 2020

(54) DIRECTING CLIENT DEVICES BETWEEN CO-LOCATED MACRO AND MICRO WIRELESS CELLS

(71) Applicant: Cisco Technology, Inc., San Jose, CA (US)

(72) Inventors: Vishal Satyendra Desai, San Jose, CA (US); John Blosco, Norton, OH (US); Allen Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/054,603

(22) Filed: Aug. 3, 2018

(65) Prior Publication Data
US 2018/0376459 A1 Dec. 27, 2018

Related U.S. Application Data

(63) Continuation of application No. 15/288,772, filed on Oct. 7, 2016, now Pat. No. 10,111,206.
(Continued)

(51) Int. Cl.
*H04W 72/04* (2009.01)
*H04W 48/18* (2009.01)
(Continued)

(52) U.S. Cl.
CPC ......... *H04W 72/04* (2013.01); *H04W 36/165* (2013.01); *H04W 48/18* (2013.01);
(Continued)

(58) Field of Classification Search
CPC ... H04W 24/02; H04W 60/04; H04W 84/045; H04W 8/26
See application file for complete search history.

(56) References Cited

U.S. PATENT DOCUMENTS

| 6,950,678 B1 | 9/2005 | Mujtaba et al. |
| 8,145,221 B2 | 3/2012 | Garg et al. |

(Continued)

FOREIGN PATENT DOCUMENTS

| EP | 1158824 A2 | 11/2001 |
| EP | 2475219 A1 | 7/2012 |
| WO | 2017196675 A2 | 11/2017 |

OTHER PUBLICATIONS

Notification of Transmittal of the International Search Report and the Written Opinion of the International Searching Authority, or the Declaration, dated Aug. 12, 2017 for Application No. PCT/US207/031383.

(Continued)

*Primary Examiner* — Chandrahas B Patel
(74) *Attorney, Agent, or Firm* — Patterson + Sheridan, LLP

(57) ABSTRACT

Embodiments herein describe using a dual assess point (AP) to establish two access points that both are established by two individual radios (e.g., two 5 GHz radios). Generally, APs experience highly degraded performance when two co-located radios operate within the same band. In one embodiment, AP devices can deploy same band radios using a macro-micro cell approach. Thus, the AP may intelligently hand off client devices between the micro and macro cell in a way that optimizes the system for overall throughput and low packet latency while creating minimal oscillation of clients between cells. The embodiments in this disclosure disclose techniques that direct clients in a manner that optimizes these factors.

20 Claims, 9 Drawing Sheets

Related U.S. Application Data

(60) Provisional application No. 62/333,578, filed on May 9, 2016.

(51) Int. Cl.
*H04W 88/10* (2009.01)
*H04W 36/16* (2009.01)
*H04W 74/08* (2009.01)
*H04W 36/32* (2009.01)
*H04W 84/04* (2009.01)
*H04W 36/22* (2009.01)
*H04W 36/04* (2009.01)
*H04W 48/20* (2009.01)
*H04W 88/08* (2009.01)

(52) U.S. Cl.
CPC ....... *H04W 74/0816* (2013.01); *H04W 88/10* (2013.01); *H04W 36/04* (2013.01); *H04W 36/22* (2013.01); *H04W 36/32* (2013.01); *H04W 48/20* (2013.01); *H04W 84/045* (2013.01); *H04W 88/08* (2013.01)

(56) References Cited

U.S. PATENT DOCUMENTS

| | | | |
|---|---|---|---|
| 8,320,331 | B2 | 11/2012 | Vikberg et al. |
| 9,179,413 | B2 | 11/2015 | Carter et al. |
| 9,894,164 | B2 * | 2/2018 | Petersen ............... H04W 4/021 |
| 2015/0024765 | A1 | 1/2015 | Xu et al. |
| 2017/0215076 | A1 | 7/2017 | Youn et al. |

OTHER PUBLICATIONS

PCT Written Opinion of the International Searching Authority for Application No. PCT/US2017/031383 dated Sep. 5, 2016.

* cited by examiner

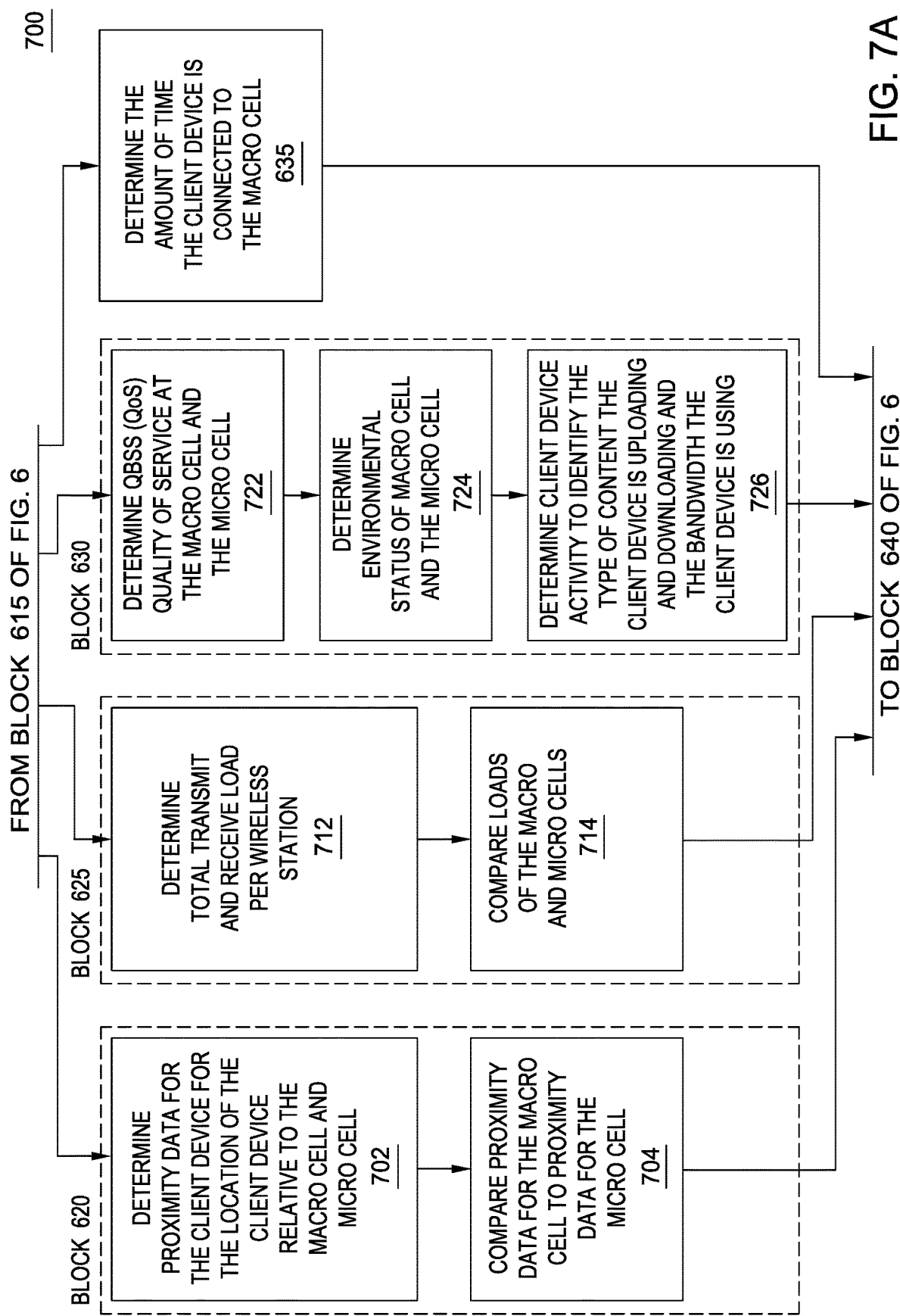

DIRECTING CLIENT DEVICES BETWEEN CO-LOCATED MACRO AND MICRO WIRELESS CELLS

CROSS-REFERENCE TO RELATED APPLICATIONS

This application is a continuation of co-pending U.S. patent application Ser. No. 15/288,772, filed Oct. 7, 2016, which claims benefit of U.S. provisional patent application Ser. No. 62/333,578, filed May 9, 2016. The aforementioned related patent application is herein incorporated by reference in its entirety.

TECHNICAL FIELD

Embodiments presented in this disclosure generally relate to access points, and more specifically, to provisioning wireless client devices between cells in an access point.

BACKGROUND

Current wireless access points (APs) allow for simultaneous operation in different bands (e.g., one in the 2.4 GHz band and one in the 5 GHz band). With the additional spectrum available in 5 GHz and the increasing bandwidth use of Wi-Fi based signals (up to 160 MHz bandwidth), many access point (AP) manufacturers want to add more 5 GHz radios into an AP. However, APs experience highly degraded performance when two co-located radios operate within the same band (e.g., two radios operating in the 5 GHz band). For example, when one radio transmits in close proximity to another radio that receives, packet reception is degraded by interference and throughput scaling is not achieved. Two factors that cause the interference include receiver overdrive and excessive transmitter noise floor.

Radio hardware is designed to operate over wide ranges of frequencies in a particular band (e.g., channels in the 5 GHz band). As such, receivers have gain and signal detection circuitry over the entire band. If one co-located and same-band radio transmits a high level signal, the high level signal can overdrive the other radio when it receives a desired signal due to close physical and spectral proximity of the radios. When this blocking occurs, the receiving radio typically loses any packets that it is currently decoding. This results in a loss of potential throughput and a "sharing" of the air time between the radios.

The second issue that limits the same band operation of co-located radios is excessive transmitter noise floor that exists in integrated circuits manufactured using currently available silicon processing technology. These integrated circuits and their associated hardware have limited outputs of band noise transmission using limited filtering capabilities which reduce baseband noise. This "transmitter noise floor" is apparent across the entire band of operation. This noise will appear in the band of the co-located same-band radio and limit the signal-to-noise-plus-interference-ratio (SINR) of that radio and in turn may limit the range of that radio. If this noise occurs during packet reception, it impacts the received signal's SINR greater than what that packet modulation would have accepted otherwise. As a result, in some circumstances, the received packet is lost.

BRIEF DESCRIPTION OF THE DRAWINGS

FIGS. 7A and 7B illustrate a flow chart depicting a method for operating a wireless access point according to embodiments described in this present disclosure.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
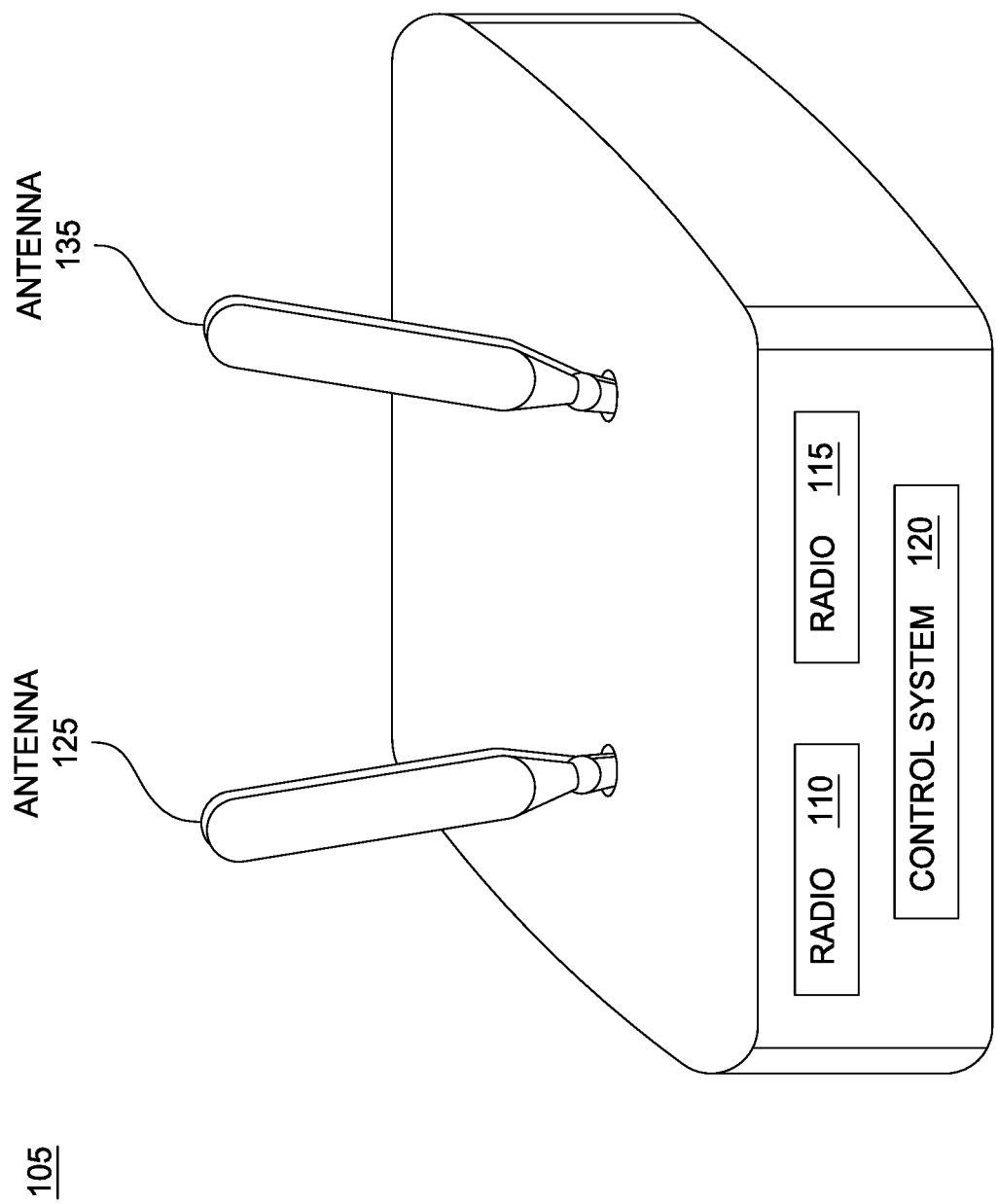
FIG. 1 illustrates a diagrammatic view of a wireless access point (AP) according to an embodiment described in this present disclosure.

One embodiment of the present disclosure is a network device that includes a body and a control system. The body includes a macro radio that includes a first antenna configured to establish a macro cell, and a micro radio that includes a second antenna configured to establish a micro cell. The control system is configured to associate a client device to the macro radio, determine, for the client device, proximity data comprising a location of the client device in the macro cell, and determine to move the client device from the macro cell to the micro cell based on the proximity data and a respective load associated with the macro radio and the micro radio. The control system is configured to perform an action at the network device to guide the client device from the macro cell to the micro cell.

Another embodiment described herein is a control system for a network device that includes a processor and a memory. The memory includes computer readable program code configured to perform an operation when executed by the processor. The operation includes associating a client device to a macro radio disposed on the network device where the macro radio establishes a macro cell. The operation includes determining, for the client device, proximity data comprising a location of the client device in the macro cell and determining to move the client device from the macro cell to a micro cell established by a micro radio in the network device based on the proximity data and a respective load associated with the macro radio and the micro radio and where a coverage area of the macro cell encloses a coverage of the micro cell. The operation includes performing an action at the network device to guide the client device from the macro cell to the micro cell.

Another embodiment described herein is a network device that includes a body, a macro radio disposed on the body and coupled to a first antenna configured to establish a macro cell, a micro radio disposed on the body and coupled to a second antenna configured to establish a micro cell, wherein a coverage area of the macro cell is spatially larger than a coverage area of the microcell and encloses the coverage area of the micro cell, and a control system. The control system is configured to associate a client device to a first cell selected from one of the macro cell and the micro cell and perform an action to move the client device to a second cell selected from the other of the macro cell and the micro cell, where moving the client device is based on proximity data of the client device and a respective load associated with the macro radio and the micro radio.

Example Embodiments

An AP device can deploy multiple same band radios using a "macro-micro" cell approach. In one embodiment, different relative coverage area sizing of the co-located same-band radios results in one of the radios being less susceptible to the artificial noise floor generated from the other radio. This approach creates two concentric circles of coverage around an AP and can be thought of as "micro" and "macro" coverage areas that can both serve clients in an un-interfered manner. Clients closer to the AP (with a relatively better signal-to-noise-plus-interference-ratio (SINR)) can be directed to link to the micro coverage area, but clients further away from the AP can be directed to link to the macro coverage area reducing the coverage area size of one of the co-located same-band radios relative to the other coverage area size results in one of the radios having lower transmitter power (e.g., lower interference relative to the other radio) which increases the isolation between the micro and micro cells.

The AP may intelligently hand off client devices between the micro and macro cells which may improve overall throughput and low packet latency, while creating minimal oscillation of clients between cells. In one example, the AP uses band steering techniques to push devices between the macro cell and the micro cell. Because the antennas of the micro-macro cell device are in a static position relative to each other, more weight can be given to the relative a received signal strength indication (RSSI) values derived by the cells and better decisions can be made relative to cells that are disposed on different network devices and are subject to path loss and large scale fading. Having the radios in the same network device (i.e., the same physical enclosure) also has benefits from a security perspective since there is no need for any communication back to a central location that could be intercepted. Because data and statistics can be taken and stored locally on the AP, decision making and action can be done more quickly without the requirement of a central switch.

In one embodiment, when first joining a network device, the client is associated to the macro cell on the device. Embodiments herein teach algorithms for determining how and when to move clients associated to the same multi radio network device between the micro and macro cells. If a client is associated to the macro cell, the AP can steer the client to the micro cell based on RSSI/Location of the client, client load of the cells, time the client has been associated to the macro cell, and/or the client type. A similar procedure is suggested for handing off a client device from the micro cell to the macro cell again using RSSI/Location data, client load, and/or client type. In one embodiment, the AP can use leverage available IEEE tools 802.11 standards available such as in IEEE 802.11v BSS Transition Request and 802.11k Assisted Roaming to transfer client devices between the macro and micro cells.

FIG. 1 illustrates a dual wireless access point (AP) 105 (e.g. dual radio AP). In accordance with some implementations, the dual AP 105 has a body in which a first radio 110 is coupled to a first antenna 125, the combination of which establishes a first cell. The body of the dual AP 105 also includes a second radio 115 coupled to a second antenna 135, the combination of which generate a second cell independent of the first cell. In one embodiment, one of the cells is a macro cell while the other is a micro cell. For example, the first radio 110 (e.g., a macro radio) and the first antenna 125 establish the macro cell while the second radio 115 (e.g., a micro radio) and second antenna 135 establish a micro cell. In some implementations, the first radio 110 and second radio 115 include respective transceivers.

In some embodiments, the first antenna 125 and second antenna 135 represent a plurality of antennas coupled to the respective radios of the dual AP 105. In some embodiments, the plurality of antennas coupled to the first radio 110 includes the same type of antennas as the plurality of antennas coupled to the second antenna 135 (e.g., dipole antenna, half-wave dipole antenna, monopole antenna, loop antenna, etc.). However, in other embodiments, first and second radios may be coupled to different types of antennas. For example, the first antenna 125 may be a vertically polarized antenna while the second antenna 135 is a horizontally polarized antenna.

The dual AP 105 includes a control system 120 used to perform the functions described herein. The control system 120 includes various hardware, firmware, and software components used to control the dual AP 105. In some implementations, the control system 120 facilitates traffic bearing communications between the dual AP 105 and one or more client devices. In one embodiment, the control system 120 causes the dual AP 105 to operate the first and second radios 110 and 115 to control the first and second antennas 125 and 135 to operate in a same frequency band (e.g., the 5 GHz band according to IEEE 802.11n, IEEE 802.11ac, or the like). In another embodiment, however, the first and second radios 110 and 115 operate on different frequency bands. For example, the first radio 110 may be controlled to operate on 5 GHz and second radio 115 operates on 2.4 GHz. As another example, the first radio 110 may be controlled to operate on 5 GHz and second radio 115 may be controlled to operate on 802.11ad. In one embodiment, the first radio 110 may be controlled to operate on 2.4 GHz and the second radio 115 may be controlled to operate on BLUETOOTH. In some implementations, the different frequency bands may be a combination of WiFi, BLUETOOTH, 5 GHz, 2.4 GHz, LTE, 3G, etc.

In one embodiment, the control system operates the first radio 110 according to a first power level and the second radio 115 according to a second power level such that the coverage area of the macro cell is larger than the coverage area of the micro cell. In one embodiment, the control system 120 is configured to control hand-off access from the macro cell to the micro cell and vice versa. Although, the control system 120 is illustrated as residing on a single device (i.e., the dual AP 105), it should be understood that in other implementations the control system 120 may reside in a separate computing device.

Figure 2:
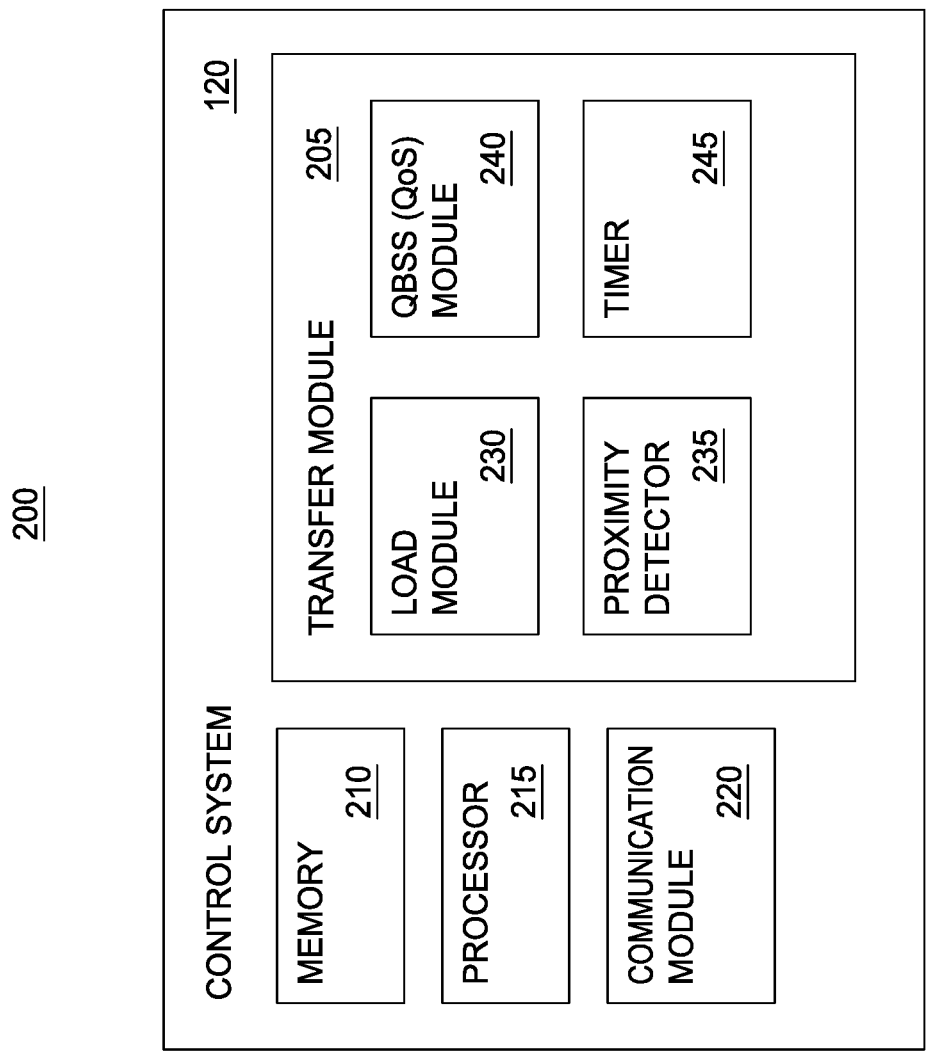
FIG. 2 illustrates a control system for operating a wireless access point according to the embodiment descried in this present disclosure.

FIG. 2 illustrates a block diagram of the control system 120 for operating the dual AP 105, according to an embodiment described in the present disclosure. For example, in some implementations, the control system 120 controls an access point (AP), router, switch, or the like. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the control system 120 includes transfer module 205, memory 210, one or processors 215, and communication module 220.

The memory 210 may include volatile memory, non-volatile memory, or combinations thereof. The memory 210 may optionally include one or more storage devices remotely located from the network device. The processor 215 represents one or more processing elements that each may include one or more processing cores. The communication module 220 may include one or more communication buses for interconnecting these and various other components.

The transfer module 205 includes a load balance module 230, proximity detector 235, quality of service (QoS or QBSS) module, and timer 245 which may include hardware components, software components, or combinations thereof.

The load balance module 230 determines the number of client devices on each cell, i.e., the macro and micro cell. In one embodiment, the load balance module 230 determines how to distribute the client device population for optimal time sharing of the radios. The load balance module 230 may make the determination based on a number of associated devices to each of the micro and macro cell, or based on per client utilization of the cells (e.g., uploading by the client device or downloading by the client device).

Proximity detector 235 determines which client devices to connect to the macro cell or the micro cell based on the relative location of the client device to the coverage area of each cell. In one example, the coverage area of the micro cell is enclosed within the coverage area of the macro cell. The proximity detector 235 may track the location of a client device once the device has associated with the macro cell. By tracking the location of the client device, the proximity detector 235 is able to determine if the location of the client device has entered the coverage area of the micro cell, and thus, is able to associate to the micro cell.

The QBSS module 240 which may be also referred to as QoS module 240 determines whether to associate a client device with the micro cell or the macro cell based on the type of device and hardware/software capabilities of the client device or based on an operating environment of each cell. The QBSS module 240 may determine which cell to associate a client device with based on client capabilities. For example, the QBSS module 240 may determine whether the client device is a legacy client or an 11ac client. The QBSS module 240 may determine which cell to associate a client device with based on client type, for example, whether the client device is segregate voice, data, video, etc. In some embodiments, after determining client device characteristics, the QBSS module 240 determines the appropriate cell to connect the client device based on the operating environment established at each cell. The operating environment includes characteristics such as bandwidth capabilities, upload capabilities, download capabilities, wireless platform capabilities (e.g., BLUETOOTH, Wi-Fi, 3G, LTE, and the like), etc.

The timer 245 determines how long a client device has been connected to the macro cell or the micro cell. The timer 245 may determine based on the time a client device is associated to the macro cell or the micro cell whether or not the client device should be transferred to the other cell. In one embodiment, the timer 245 enables the dual AP 105 to manage client devices in order to prevent client devices from oscillating between the macro cell and the micro cell within a certain amount of time.

Figure 3:
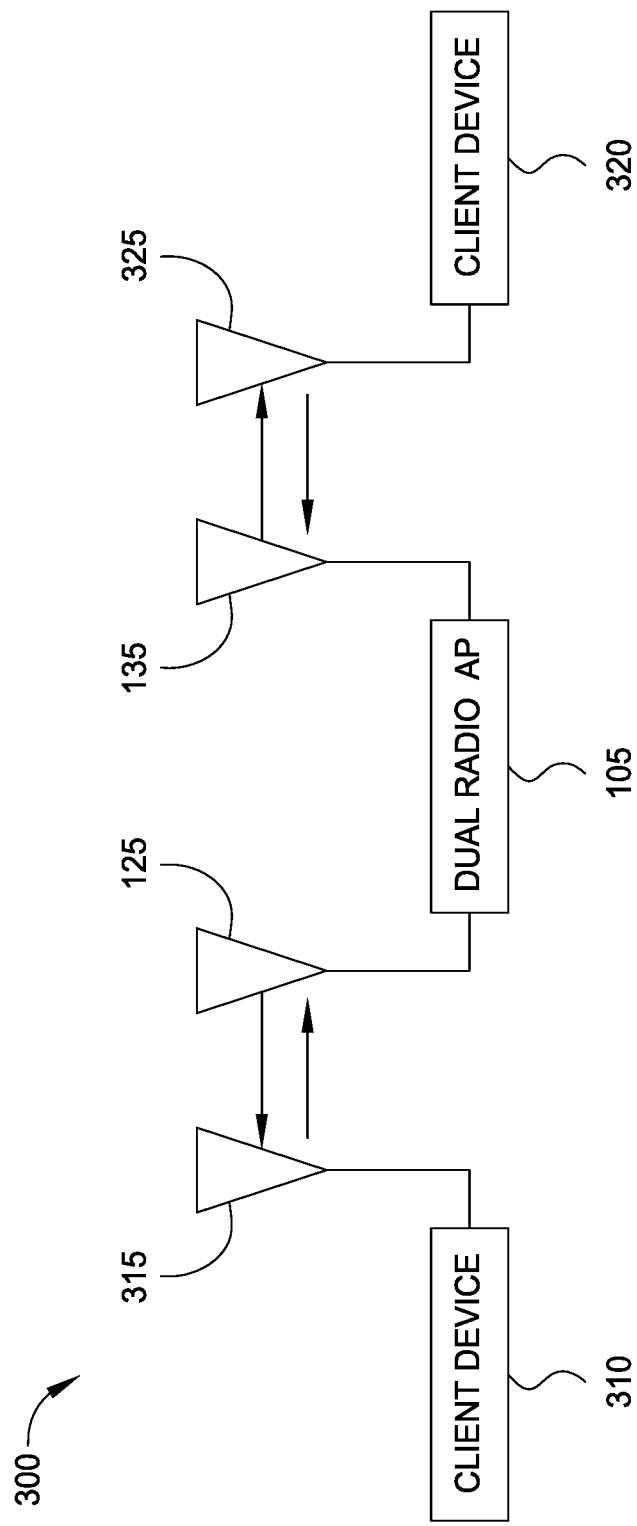
FIG. 3 illustrates a block diagram of an example antenna arrangement according to an embodiment described in the present disclosure.

FIG. 3 illustrates an example antenna arrangement according to an embodiment described in the present disclosure. The dual radio access point (AP) 105 includes a first macro radio (not shown) coupled to a first antenna 125 which establish the macro cell. The dual AP 105 also includes a second micro radio (not shown) coupled to the second antenna 135 which establishes the micro cell. In FIG. 3, the dual AP 105 establishes a connection with a first client device 310 via antenna 125 by transmitting and receiving macro cell signals to and from client device 310, which transmits and receives the macro cell signals via antenna 315. The dual AP 105 also establishes a connection with a second client device 320 via antenna 135 by transmitting and receiving micro cell signals to and from client device 310, which transmits and receives the micro cell signals via antenna 325.

If the antennas 125 and 135 transmit and receive on the same band (e.g., 5 GHz), when both radios of the dual AP 105 transmit or receive simultaneously with sufficient frequency separation (i.e., which varies based on the quality of filters/chipset and the Wi-Fi spectrum but for 5 GHz, 100 MHz provides adequate isolation for radios to operate as micro-macro cells), the interference between the two radios is controllable. Furthermore, in accordance with some embodiments, if neither of the radios is transmitting or receiving, there also should not be interference problems. However, if one of the radios of the dual AP 105 is transmitting and the other is receiving, the receiving radio is subject to being overdriven and/or having an increased noise floor, which can degrade the received signal significantly. Furthermore, if both of the radios of the dual AP 105 are transmitting the increased SINR at the client devices 310 and 320 causes the transmitted signal to be corrupted. Embodiments described below for operating the one or more radios of the dual AP help to mitigate these deficiencies.

Figure 4:
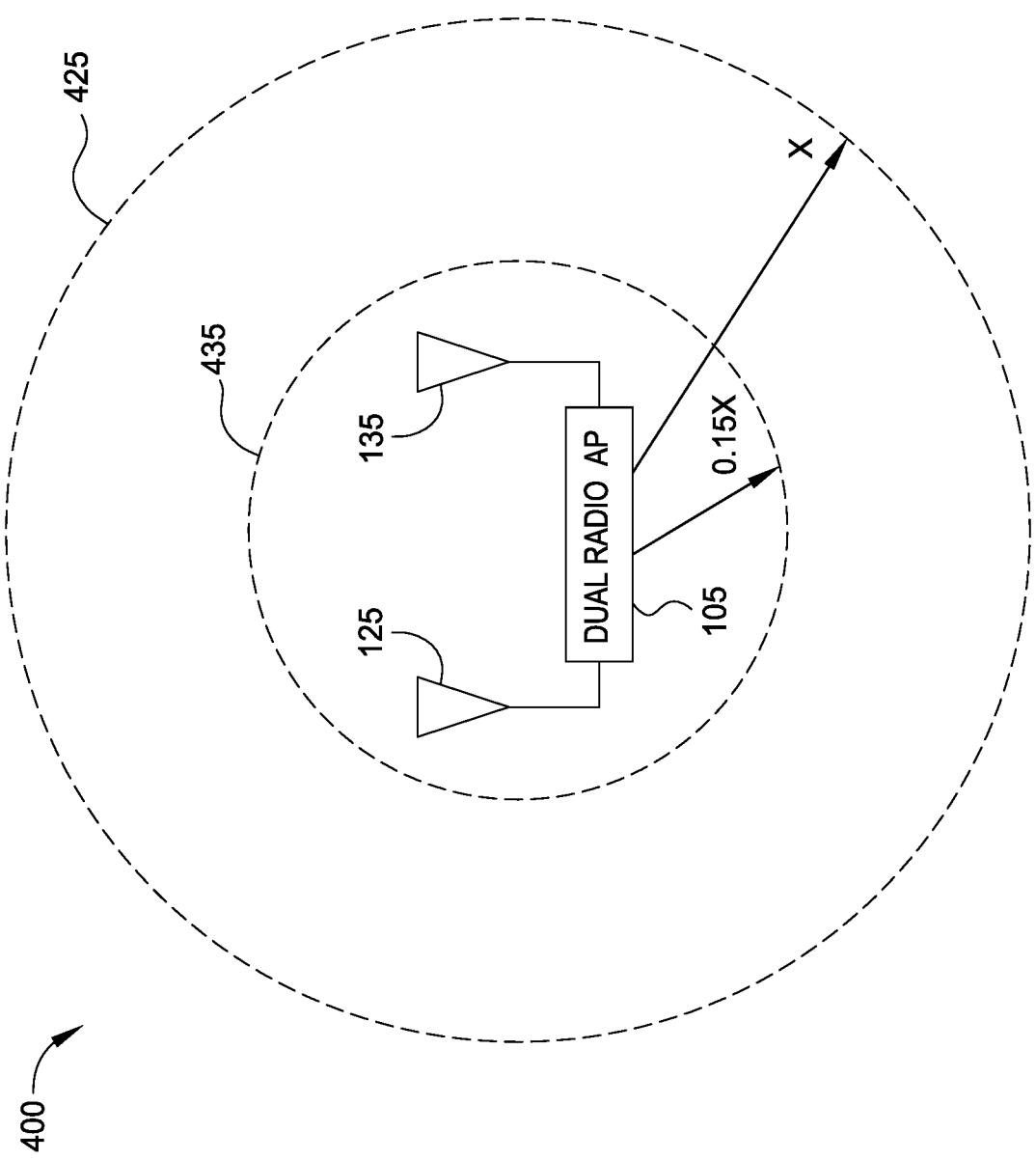
FIG. 4 illustrates an example operating environment of a dual radio access point (AP) according to an embodiment described in this present disclosure.

FIG. 4 illustrates an example operating environment of a dual radio access point (AP) according to an embodiment described in this present disclosure. As shown in FIG. 4, a first radio of the dual AP 105, which is coupled to antenna 125 (e.g., establishing a macro cell), has a coverage area 425 with a radius X. As shown in FIG. 4, a second radio of the dual AP 105, which is coupled to antenna 135 (e.g., establishing a micro cell), has a coverage area 435 with a radius of, for example, 0.15X. Those of ordinary skill in the art will appreciate that the size and shape of coverage areas 425 and 435 are different in other implementations. As shown in FIG. 4, the first coverage area 425 covers more area than the second coverage area 435. Further, the first coverage area 425 completely surrounds or encloses the second coverage area 435.

In some implementations, the dual AP 105 operates the first radio at a first power level (e.g., full power) in order to establish the first coverage area 425 (e.g., a macro cell) and operates the second radio at a second power level (e.g., 15% of full power) to establish the second coverage area 435 (e.g., a micro cell). In one embodiment, the second power level is set relative to the first power level to satisfy an isolation criterion (e.g., at least 30 dB, 40 dB, etc.) of isolation.

Figure 5A:
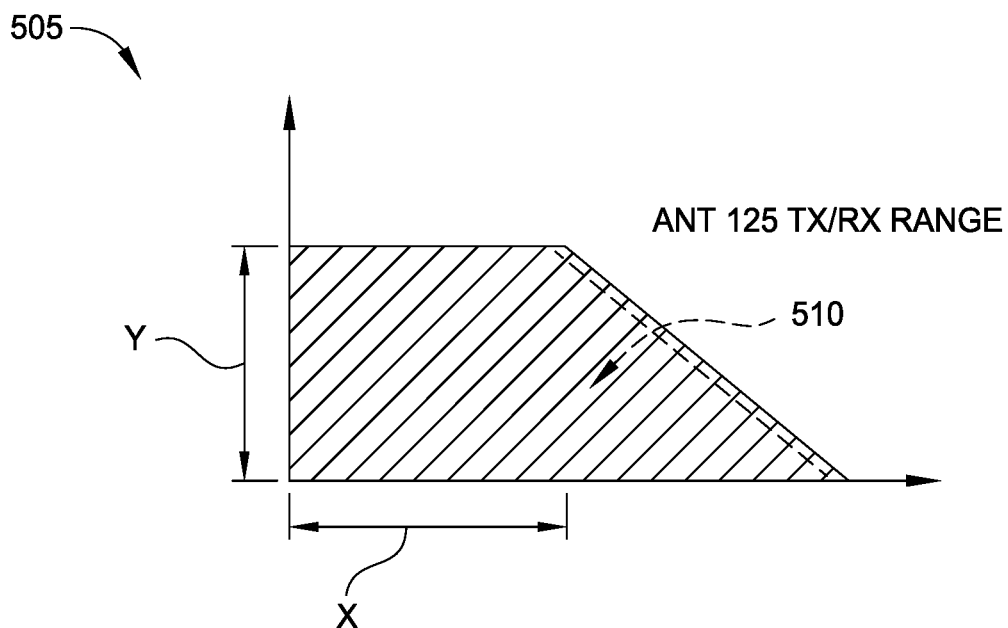
FIGS. 5A and 5B illustrate an example graphical representation of the range versus throughput for a first radio and a second radio of a dual AP according to an embodiment described in this present disclosure.

FIG. 5A is an example graphical representation 505 of the range versus throughput for the first radio 110 of the dual AP 105 in FIG. 4 in accordance with some implementations. The Y axis of the graphical representation 505 indicates the throughput of the first radio 110 of the dual AP 105, which is associated with antenna 125 while the X axis of the graphical representation 505 indicates the range (e.g. coverage area) of the first radio of the dual AP 105. In FIG. 5A, the area 510 indicates the performance of the throughput/range of the first radio 110 of the dual AP 105 when operating in a full power mode (e.g., a macro mode to produce the macro coverage area 425 in FIG. 4).

Figure 5B:
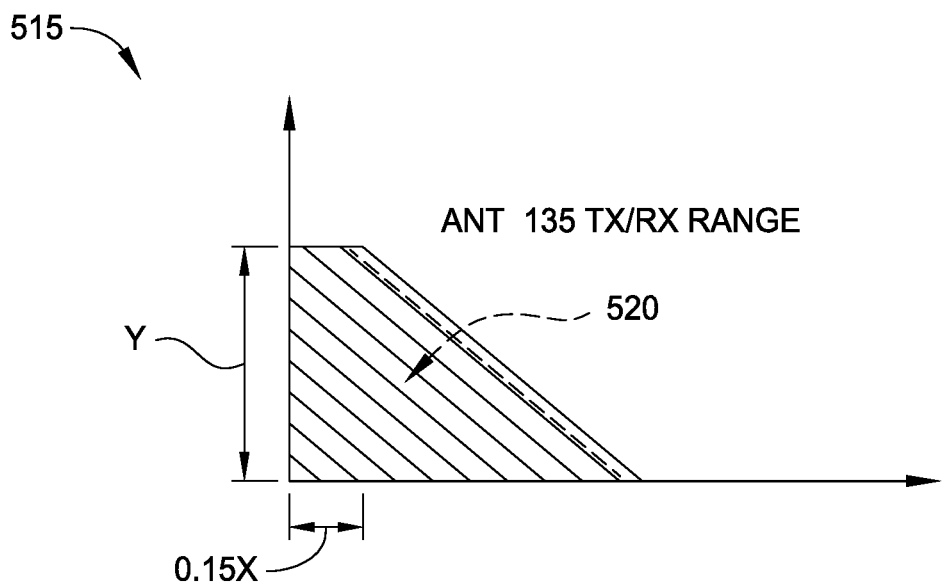

FIG. 5B is an example graphical representation 515 of the range (e.g., coverage area) versus throughput for a second radio of the dual AP 105 in FIG. 4 in accordance with some implementations. In this example, the Y axis of the graphical representation 515 indicates the throughput of the second radio of the dual AP 105, which is associated with antenna 135 while the X axis indicates the range (e.g., coverage area) of the second radio of the dual AP 105. The area 520 indicates the performance of the throughput/range of the second radio of the dual AP 105 when operating in a reduced power mode (e.g., the micro coverage area 435 in FIG. 4).

Figure 6:
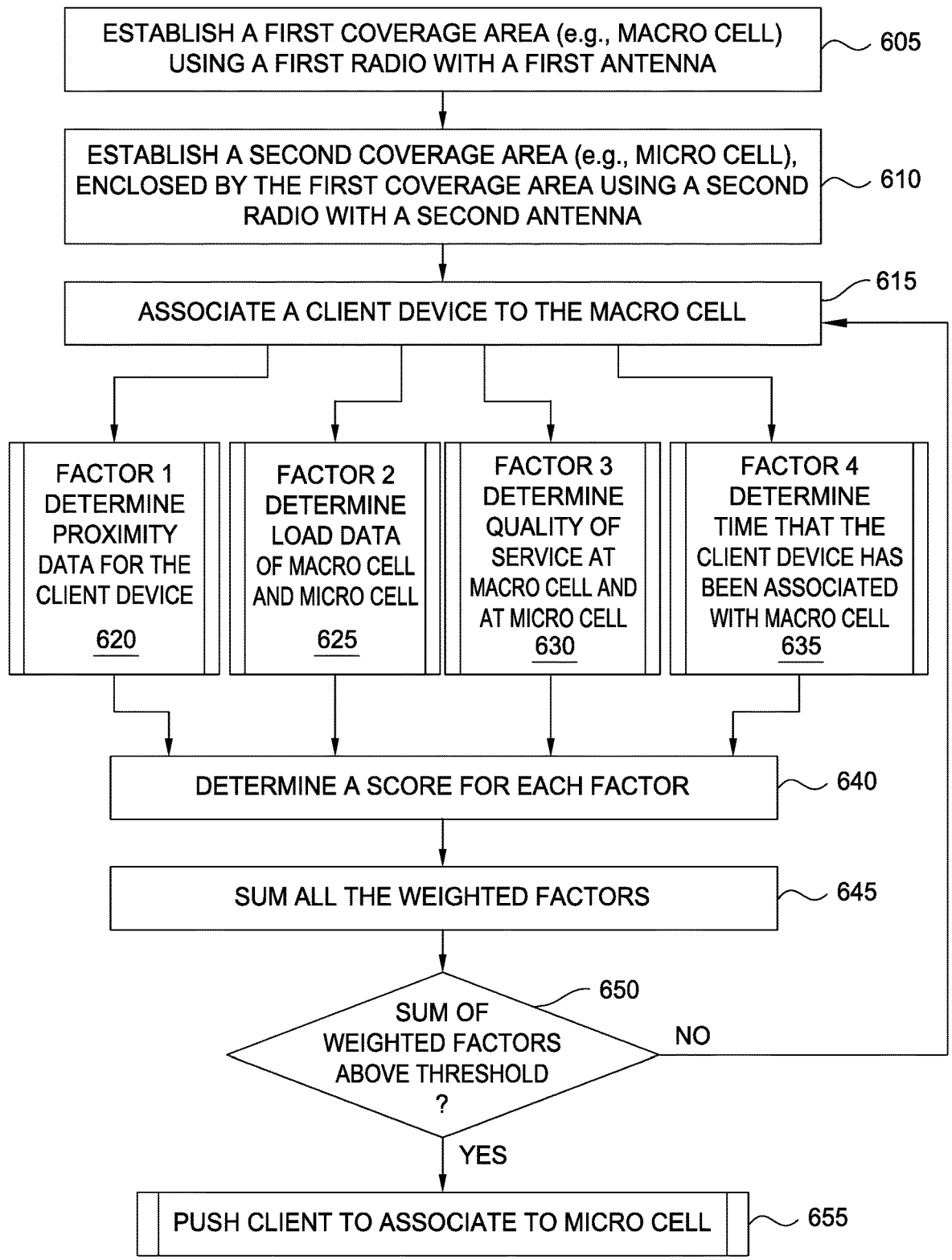
FIG. 6 illustrates a flow chart depicting a method for operating a wireless access point according to embodiments described in this present disclosure.

FIG. 6 is a method 600 for operating a wireless access point (AP) according to an embodiment described in this present disclosure. Method 600 is used to determine whether to transfer a client device from associating with a macro cell to instead associate with a micro cell. At block 605, the dual AP establishes a first coverage area (i.e., a macro cell) using a macro radio coupled with a first antenna.

At block 610, the dual AP establishes a second coverage area (i.e., a micro cell) enclosed by the first coverage area using a micro radio coupled with a second antenna. In one embodiment, the coverage area of the micro cell is enclosed within the coverage area of the macro cell.

A macro cell and micro cell are coverage areas that allow a client device to associate or connect to a wireless network provided by the dual band AP. The macro cell designates a coverage area that is spatially larger than the coverage area established by the micro cell. In some implementations, the macro cell establishes a generic wireless access point, and the micro cell establishes an enhanced wireless access point. The enhanced wireless access point may have a faster transmission speed, larger bandwidth, use certain or predefined wireless protocols, etc. in comparison to the wireless access point established by the macro cell. For example, based on the technology embedded in micro cell, different class of services can be offered. Even when both radios operate in 2.4 GHz/5 GHz Wi-Fi spectrum, the macro cell can be configured with lowest rates (even CCK) to offer maximum coverage but the micro cell is configured with higher basic 802.11n/802.11ac rates which enable better client throughput and performance.

At block 615, a client device associates to (or joins) the macro cell. The client device associates to the macro cell first because the macro cell is larger in coverage area. As a client device moves in a coverage area of the dual AP it is identified by the macro cell. In one embodiment, the AP does not allow a device to connect to the micro cell before the client device connects to the macro cell. Thus, even if the client device is first powered on within the coverage area of the micro cell, the AP forces the client device to join the macro cell before being able to associate to the micro cell.

Blocks 620, 625, 630, and 635 represent different actions that can be performed by the transfer module to determine whether to transfer a client device from the macro cell or the micro cell. The transfer module can perform blocks 620, 625, 630, and 635 in parallel or in series.

At block 620, the proximity detector of the transfer module determines the location of the client device within the macro cell as a first factor. The proximity detector determines if the client device is only located within the coverage area of the macro cell or if the client device is also within the coverage area of the micro cell.

At block 625, the load balance module of the load balance module of the control system determines the upstream and downstream load on the cells. The load balance module compares the load on the cells, and based on this comparison, the load balance module determines whether a client device should be pushed from the macro cell to the micro cell.

At block 630, quality of service (QBSS or QoS) module of the transfer module determines the quality of service at the macro cell and at the micro cell as a third factor. The quality of service may relate to the bandwidth, upload and download speed, transmission speeds, signal to noise ratio, wireless standards (e.g., 3G, LTE, BLUETOOTH, Wi-Fi, infrared (IR), etc.) In some implementations, QoS is the overall performance of the macro or micro cell. The QoS covers the performance seen by the client device and can include bit rate, throughput, transmission delay, availability, jitter, etc.

At block 635, the timer of the transfer module of the control system determines how long a client device has been associated with the macro cell as a fourth factor. The timer may also compare the amount of time the client device has been associated to the macro cell to a threshold. Based on whether the time is above or below the threshold, the timer may decide that the client device should be pushed from the macro cell to the micro cell.

At block 640, the transfer module determines a score for each factor, i.e., factor 1: block 620, factor 2: block 625, factor 3: block 630, and factor 4: block 635, to determine whether or not to push the client device from the macro cell to the micro cell. The transfer module may determine a weighted score for each factor. The method for weighing each factor may be predetermined or programmed by a user or service provider. Each factor may have a threshold or a number of thresholds (e.g., different threshold levels) and depending on which threshold is reached it may determine the weight score of each factor.

For example, using the functions described in blocks 620-635, the transfer module may determine that the client device is in the proximity of the micro cell, there are no devices associated with the micro cell, seven client devices are associated with the macro cell, and that the client device operates at an enhanced environment provided by the micro cell. The transfer module also determines, using the timer that the client device has only been associated with the macro cell for 3 seconds and the threshold is 15 seconds. The transfer module may weigh each factor based on a predefined scale of importance—e.g., factor 1 may receive a score of 5, factor 2: 10, factor 3: 5, and factor 4: 1.

At block 645, the transfer module sums all the weighted factors to determine an overall factor score. At block 650, the transfer module compares the overall factor value with a threshold value. If the overall factor value is above the threshold, the method proceeds to block 655. If the overall factor value is below the threshold, the method returns to block 615. The threshold may be predetermined or selected by a service provider. In one embodiment, the transfer module dynamically determines the threshold based on, e.g., time of day, previous characteristics of operation of the each cell, total number of devices connected to dual AP, etc.).

At block 655, the transfer module pushes the client device to the micro cell, which includes de-associating the client from the macro cell. The details of transferring the client device from the macro cell to the micro cell are described below in FIG. 7B.

FIG. 7A illustrates a method 700 for operating a wireless access point according to embodiments described in this present disclosure. Method 700 begins after block 615 in method 600 has been performed. Method 700 provides various examples of performing blocks 620, 625, 630, and 635 of method 600.

Block 620 comprises sub-blocks 702 and 704. At block 702, the proximity detector determines proximity data for the client device for the location of the client device relative to the macro cell and the micro cell. The proximity detector determines where in the macro cell the client device is located.

At block 704, the proximity detector compares the proximity of data for the macro cell to proximity data for the micro cell. From determining the location of the client device, the proximity detector is able to determine if the client device is in the coverage area of the micro cell.

In one embodiment, the proximity detector determines whether the received signal strength indication (RSSI) level of the client device rises above a RSSI threshold decibel (e.g., X_dB or X_dBm). Based on the RSSI level the proximity detector determines whether the client device is in the coverage area of the macro cell only, or within the coverage area of both the macro cell and the micro cell.

In one embodiment, a RSSI measurement may be based on a signal (e.g., a RSSI signal) received from each client at the dual AP. The proximity detector may keep track of the average composite RSSI signal from all associated devices as the average of the last 5 control/management packets it receives (not data packets). RSSI composite measurement for a packet may be the strongest signal measured across all data receiver paths. In one embodiment, a derived RSSI may be calculated based on a path lost delta leveraging operating power difference between the macro and micro cells.

In one example, the dual AP may have DRTT, TDOA, AoA, or the like capabilities, and based on these capabilities, the proximity detector determines whether the client device is within the coverage area of the micro cell.

In one embodiment, the transfer module receives associated client device entry information from the proximity detector. For example, to generate the entry information, the proximity detector reads the client device RSSI at the macro cell. The proximity detector derives an estimated client device RSSI at the micro cell using path loss delta, where the operating power level difference between the macro cell and the micro cell is used to compute the derived RSSI at the micro cell. The proximity detector compares the client device RSSI at the macro cell to the derived RSSI at the micro cell and determines whether to push the client device from the macro cell to the micro cell.

As shown, block 625 includes sub-blocks 712 and 714. At block 712, the load balance module determines total transmit and receive load per wireless station (e.g., the respective loads of the micro and macro cells). At block 714, the load balance module compares the loads of the micro and macro cells which include the upstream and downstream data flowing through the cells. In one embodiment, the load balance module uses the following equation to determine the load of a cell:

$$\text{Total Load} = \Sigma[\text{Client Count}(\text{Rx.Util} + \text{Tx.Util})] + \text{QBSS} \quad (1)$$

In Equation 1, the total load is determined by adding data about the upstream data utilization (Tx.Util) and downstream data utilization (Rx.Util) of each client device. Then, the sigma of the client count is summed with environment data. For each client device, the transfer module can sum the uploading and the downloading activities of the client device, thus resulting in the total cell bandwidth used by the client devices. QBSS represents the general utilization of the cell such as the amount of activity on a wireless network causing the wireless network or access point to be none operational or sub-operational performance because of the amount of activity on the cell (e.g., a noise source such as a microwave affects the operation of the cell). The transfer module can use Equation 1 to determine the load based on client device activities, as well as load based on macro cell or micro cell environment.

In some examples, once the load balance module determines the number of client devices associated with each cell (i.e., macro and micro) the load balance module compares the number of client devices associated to each cell and determines whether to push client devices from the macro cell to the micro cell. The load balance module may attempt to keep the same number of client devices on each cell, or a certain ratio or percentage of the client devices on the micro cell and the remaining client devices on the macro cell. For example, if the dual AP wants an equal number of client device associated to each cell, then the load balance module determines the total number of devices on each cell and makes the corresponding adjustments.

Block 630 comprises sub-blocks 722, 724, and 726. At block 722, the QBSS module determines the quality of service of the coverage area provided by the macro cell and the quality of service of the coverage area provided by the micro cell. The quality service may be data including upload data, download data, connection time data, environmental data, etc.

At block 724, the QBSS module determines environmental status of macro cell and the micro cell. At block 726, the QBSS module determines client device activity to identify the type of content the client device is uploading and downloading and/or the bandwidth the client device is using. At block 728, the QBSS module analyzes all the acquired data from blocks 722-724 and determines if the client device would be better serviced by the macro cell or the micro cell. If the client device is better supported by the macro cell, then the method proceeds to block 722. If the QBSS module determines the client device is better supported by the micro cell, then the method proceeds to block 640.

In one embodiment, the QBSS module also determines client device characteristics (e.g., device type, wireless platform, operating parameters, operating capabilities, etc.). For example, the QBSS module may determine what platforms and services a client device associated to the macro cell may be able to support e.g., based on client device capabilities (e.g., legacy client, 802.11ac, 802.11n, 802.11k, 802.11v BSS transition, etc.) or client type (e.g., segregate voice, data, video, etc.). Based on the ability of the client device to support certain services and platforms the QBSS module determines whether to push the client device from the macro cell to associate with the micro cell. In some embodiments, the micro cell may offer enhanced services, or superior access point capabilities when compared to the macro cell.

At block 635 the timer determines the amount of time the client device is connected to the macro cell. The time determines if the amount of time the client device is associated with the macro cell is above a threshold. For example, the timer may determine a client device is associated with the macro cell for 15 seconds. If the client device has been associated with the macro cell longer than the threshold of time, the timer may determine it is appropriate to push the client device to the macro cell.

The different paths in method 700 transmit scores or factors to block 640 of FIG. 6 where the transfer module can weight each factor and determine whether to push the client device to the micro cell as described above.

Figure 7B:
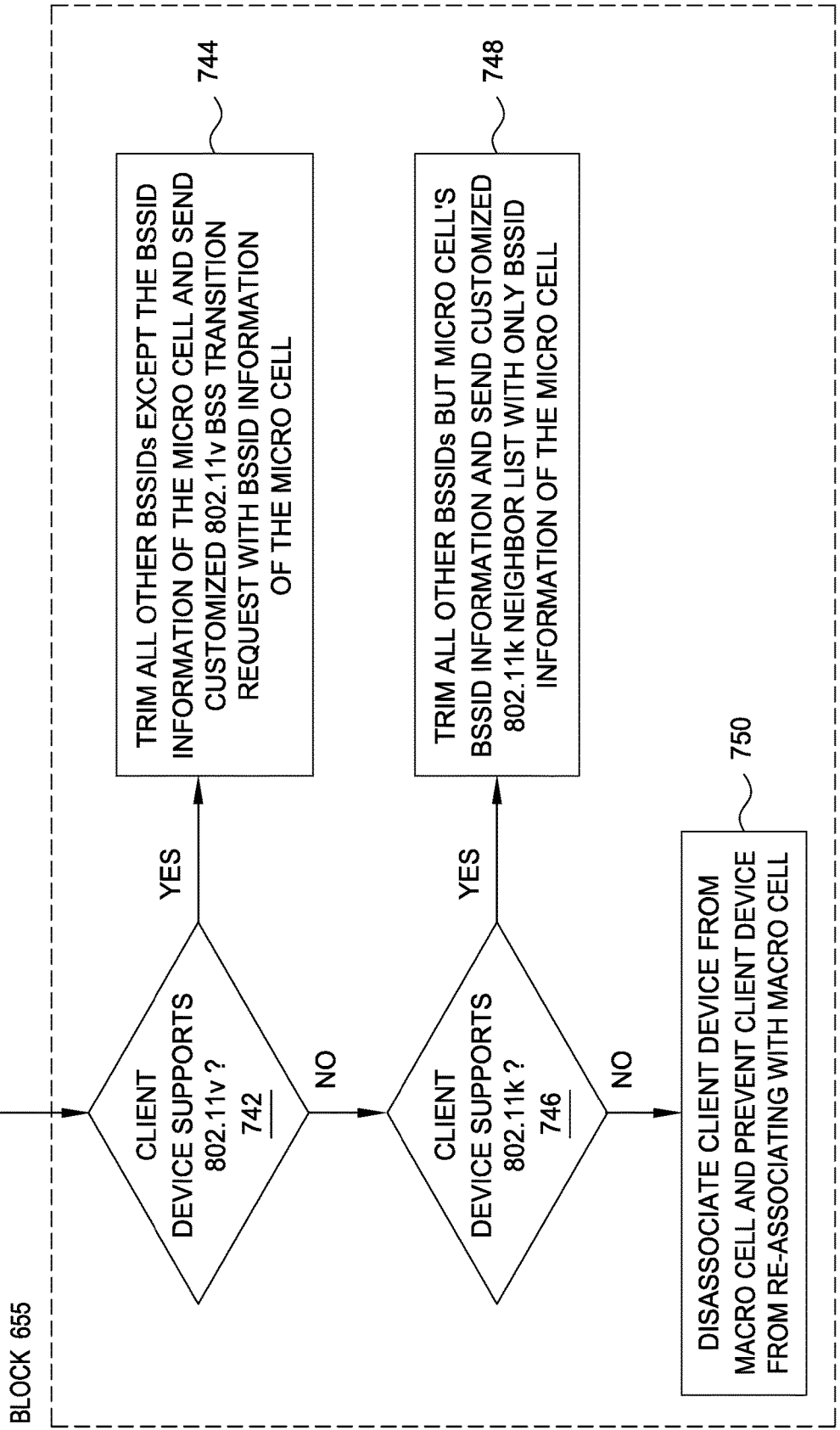

FIG. 7B illustrates a method 710 that depicts an operation of a wireless access point according to embodiments described in this present disclosure. Method 710 further details the method described in block 655, which is broken down into sub-blocks 742, 744, 746, 748, and 750.

At block 742, the transfer module determines whether the client device supports 802.11v. If the client device supports 802.11v, the method proceeds to block 744. If the client device does not support 802.11v, the method proceeds to block 746.

At block 744, the transfer module trims all other BSSIDs except for BSSID information associated with the micro cell. The transfer module transmits a customized 802.11v BSS transition request with only the BSSID information associated with the micro cell to the client device. In response, the client device roams from the macro cell and joins the micro cell. In embodiment, BSS transition provides seamless roaming to wireless clients without needing to re-associate to the macro or micro cells.

At block 746, the transfer module determines whether the client device supports 802.11k. In one embodiment, the transfer module determines whether a client device supports 802.11k assisted roaming and/or 802.11v Basic Service Set (BSS) transition. In another embodiment, the transfer module determines whether a client device supports 802.11n or 802.11ac by validating high throughput (HT) which corresponds to 802.11n or very high throughput (VHT) which corresponds to 802.11ac capabilities information and information elements. After the determination, the transfer module determines how to push the client device to the micro cell. If the client device supports 802.11k, the method proceeds to block 748. If the client device does not support 802.11k, the method proceeds to block 750.

At block 748, the transfer module causes the AP to remove all other BSS identifications (BSSIDs) except for BSSID information associated with the micro cell. The transfer module transmits a customized 802.11k neighbor list with only the BSSID information associated with the micro cell to the client device. In response, the client device roams from the macro cell and joins the micro cell.

At block 750, if the client device does not support any of the platforms the transfer module checks for, then the transfer module causes the dual AP to determine whether a disassociation counter is below a threshold. In one example, the disassociation counter is incremented each time the AP disassociates the client device from the macro cell. For example, if the counter is below the threshold, the transfer module sends disassociate request to the client device and increments the disassociation counter. In this example, the transfer module cannot explicitly instruct the client device to join the micro cell. If the client device re-associates with the macro cell, this step is repeated. Because the AP cannot force the client device to join the micro cell, by continually preventing the client device from re-associating with the macro cell, the client device will hopefully, by its own initiative, couple to the micro cell.

In another example, if the client device does not support 802.11v or 802.11k, and the control system of the dual AP wants to force the client device to a micro cell, the transfer module sends the client device a disassociation message. However, if the disassociation counter is above the threshold, the AP may permit the client device to re-associate with the macro cell. For example, if the dual AP receives more than 3 re-association requests to the macro cell within a certain time based window from the same client device, the transfer module will allow the client device to re-associate since constantly preventing the client device from joining interrupts the service provided to the client device.

In one embodiment, it may be necessary for the transfer module to block a client device from associating to a cell. In one example, the transfer module uses association rejection. Association rejection can be performed by embedding neighbor report elements within a response frame and association denial with reason code REJECTED_WITH_SUGGESTED_BSS_TRANSTION. In another example, the transfer module uses probe suppression where the micro radio does not respond to probe requests. For example, a micro cell will not respond to probe request until the client device has been associated to the macro cell. Thus, the transfer module verifies whether or not the client device was first associated with the macro cell.

Figure 8:
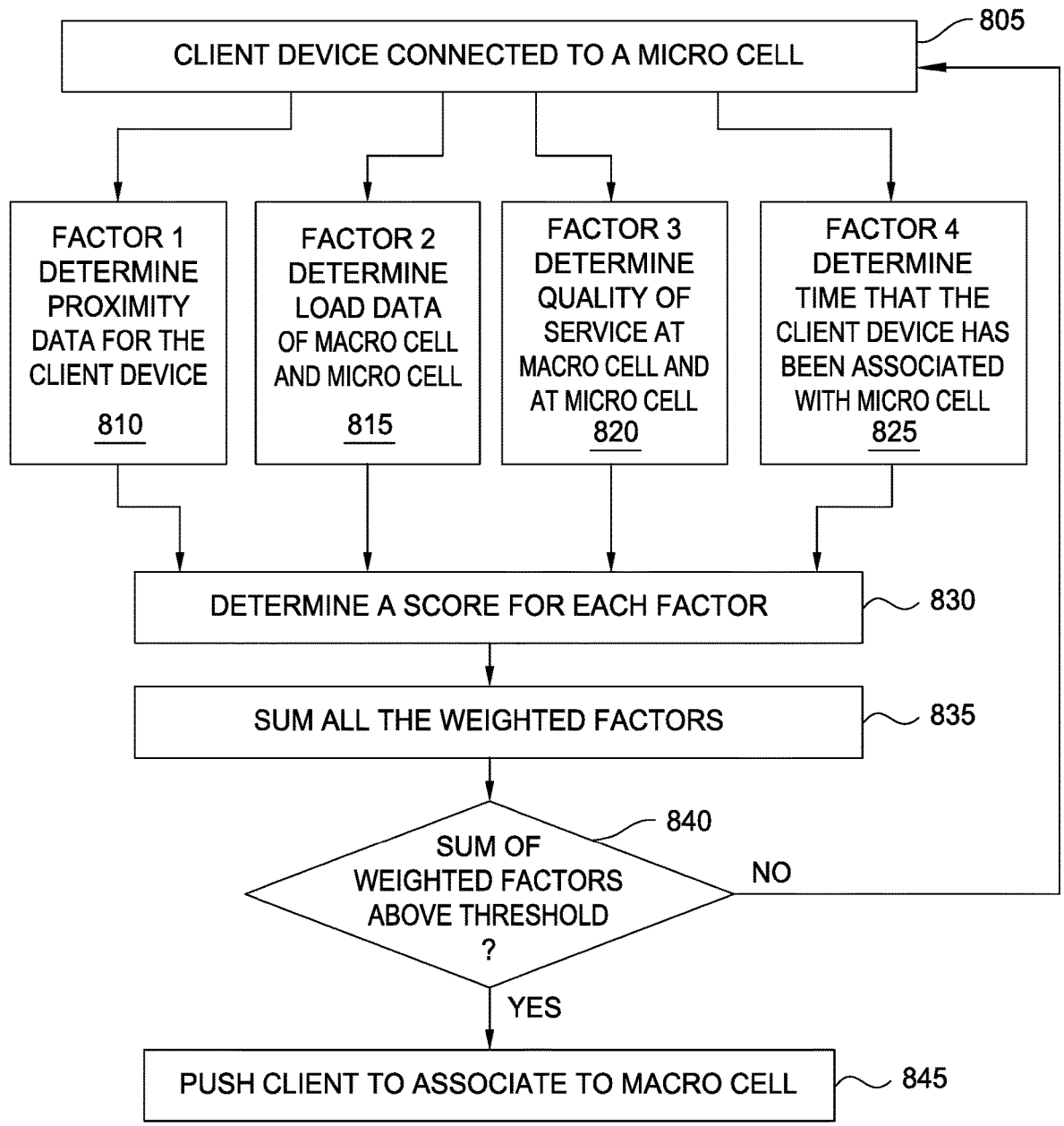
FIG. 8 illustrates operating a wireless access point according to an embodiment described in this present disclosure.

FIG. 8 illustrates a method 800 for operating a wireless AP according to an embodiment described in this present disclosure. Method 800 is used to determine whether to push a client device from associating with a micro cell to instead associate with a macro cell. Many of the steps or blocks of method 800 are similar to those of method 600, and therefore, in describing method 800 method 600 may be mentioned repeatedly. Overall, method 800 is similar to method 600; however, the major difference is that method 800 describes a method for pushing a client device from the micro cell to the macro cell.

At block 805, a client device is associated to the micro cell. In one embodiment, the client device may have previously been associated with the macro cell. For example, the AP may require all client devices to first join the macro cell before joining the micro cell. However, in another embodiment, the client device may first associate with the micro cell (before joining the macro cell). For example, a client device may have powered up within the coverage of the micro cell and the AP may permit the client device to first connect to the micro cell.

At block 810, the proximity detector of the transfer module determines the proximity data for the client device. This block is similar to the method described in block 620 of method 600. Therefore, block 620 may be referred to describe this block, i.e., 810. In one embodiment, the proximity detector may determine that a client device is no longer within a coverage area of the micro cell, and thus, determine that the client device needs to be pushed from the micro cell to associate with the macro cell. In another embodiment, the proximity detector may determine the client device is within the coverage area of the micro cell, and therefore, determines that the client device does not need to be pushed to the macro cell.

At block 815, the load balance module of the transfer module determines load data of the macro cell and the micro cell. This block is similar to the method described in block 625 of method 600. The load balance module may attempt to keep the same number of client devices on each cell, or a certain ratio or percentage of the client devices on the micro cell and the remaining client devices on the macro cell.

At block 820, the QBSS module of the transfer module determines quality of service at the macro cell and the micro cell. This block is similar to the method described in block 630 of method 600. That is, the transfer module may evaluate the same QBSS factors described above to determine if the client device should join the macro cell instead of the micro cell.

At block 825, the timer of the transfer module of the control system determines how long a client device has been associated with the micro cell. The timer may also compare the amount of time the client device has been associated to the micro cell to a threshold. Based on whether the time is above or below the threshold the timer may decide that the client device should be pushed from the micro cell to the macro cell. One goal of the transfer module is to avoid oscillation between macro and micro cells for clients that are passing by the access point.

At block 830, the transfer module weighs determines a score for each factor. At block 835, the transfer module sums all the factors.

At block 840, the transfer module determines whether the overall factor value is above a threshold value. If the overall factor value is above the threshold, the method proceeds to block 845. If the overall factor value is below the threshold, the method proceeds to block 805.

At block 845, the transfer module pushes the client device to de-associate with, or roam from, the micro cell and associate with the macro cell. In one embodiment, the transfer module performs the same techniques described in method 710 shown in FIG. 7B except the techniques are modified to move the client device from the micro cell to the macro cell.

Furthermore, the embodiments herein recite a micro and micro cell but are not limited to only two cells. For example, the network device may include a third radio for establishing a third cell that is smaller, and surrounded by, the micro cell. Thus, the transfer module may have rules from moving client devices from the macro and/or micro cell into the third cell and back again. For example, the third cell may be a different band (e.g., 802.11ad 60 Hz cell) than the macro and micro cells (e.g., 5 GHz).

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A network device comprising:
a body;
a macro radio disposed on the body and coupled to a first antenna configured to establish a macro cell;
a micro radio disposed on the body and coupled to a second antenna configured to establish a micro cell, wherein a coverage area of the macro cell is spatially larger than a coverage area of the micro cell and encloses the coverage area of the micro cell; and
a control system configured to:
associate a client device to the macro radio;
determine, for the client device, proximity data for the client device in the macro cell;
determine a load associated with the macro radio and a load associated with the micro radio;
determine to move the client device from the macro cell to the micro cell based on the proximity data and the load associated with the macro radio and the load associated with the micro radio; and
perform an action at the network device to guide the client device from the macro cell to the micro cell.

2. The network device of claim 1, wherein the action comprises preventing the client device from associating with the micro radio before the client device associates with the macro radio.

3. The network device of claim 1, wherein the load associated with the micro radio comprises at least one of upstream data utilization and downstream data utilization of one or more client devices associated with the micro cell and the load associated with the macro radio comprises at least one of upstream data utilization and downstream data utilization of one or more client devices associated with the macro cell.

4. The network device of claim 1, wherein determining to move the client device to the micro cell is based on client device data, wherein the client device data comprises at least one of: upload data, download data, connection time data to the macro radio, and proximity data, wherein the proximity data comprises received signal strength indication (RSSI) data.

5. The network device of claim 1, wherein determining to move the client device to the micro cell is based on at least one of macro cell characteristics and micro cell characteristics, wherein the macro cell characteristics and micro cell characteristics each comprise environment data about operation conditions and bandwidth of the micro and macro cells, upstream or downstream load of the macro and micro radios, and utilization and transmission conditions about amount of content being uploaded and download at each macro or micro radio.

6. The network device of claim 1, wherein determining to move the client device to the micro cell is based on a received signal strength indication (RSSI) threshold associated with the client device, wherein the RSSI threshold represents an outer bound of the micro cell for the client device to be located within the coverage area of the micro cell.

7. The network device of claim 6, wherein the control system is configured to not move the client device until the client device has associated with the macro radio and a threshold of time has elapsed.

8. The network device of claim 1, wherein the control system is configured to:
identify all basic service set identifier (BSSID) information for radios within range of the client device;
provide, to the client device, a 802.11k neighbor list only comprising BSSID information for the micro radio; and
instruct the client device to associate with the micro radio based on the 802.11k neighbor list.

9. The network device of claim 1, wherein the control system is configured to:
identify all BSSID information for radios within range of the client device;
provide, to the client device, a 802.11v BSS transition request comprising BSSID information for the micro radio; and
instruct the client device to associate with the micro radio based on the 802.11v BSS transition request.

10. The network device of claim 1, wherein performing the action comprises:
disassociating, after determining to move the client device to the micro cell, the client device from the macro cell;
preventing, after disassociating the client device from the macro radio, the client device from re-associating with the macro radio; and
enabling, based on preventing the client device from re-associating with the macro radio, the client device to associate with the micro radio.

11. The network device of claim 1, wherein the control system is configured to:
   determine, after the client device associates with the micro radio, to move the client device to associate with the macro radio based on at least one of:
      a RSSI threshold associated with the client device, wherein the RSSI threshold represents an outer bound of the micro cell for the client device to be located within a coverage area of the micro cell,
      not moving the client device until the client device has associated to the micro cell and a threshold of time has elapsed, and
      compare upstream or downstream loads associated with each radio; and
   associate the client device to the macro radio.

12. A control system for a network device, comprising:
   a processor; and
   a memory comprising computer readable program code configured to perform an operation when executed by the processor, the operation comprising:
      associating a client device to a macro radio disposed on the network device, wherein the macro radio establishes a macro cell,
      determining, for the client device, proximity data comprising a location of the client device in the macro cell,
      determining a load associated with the macro radio and a load associated with a micro radio;
      determining to move the client device from the macro cell to a micro cell established by a micro radio in the network device based on the proximity data and the load associated with the macro radio and the load associated with the micro radio, wherein a coverage area of the macro cell is spatially larger than a coverage area of the micro cell and encloses the coverage area of the micro cell; and
      perform an action at the network device to guide the client device from the macro cell to the micro cell.

13. The control system of claim 12, wherein the action comprises:
   preventing the client device from associating with the micro radio before the client device associates with the macro radio.

14. The control system of claim 12, wherein determining to move the client device to the micro cell is based on client device data, wherein the client device data comprises at least one of: upstream data, downstream data, connection time data to the macro radio, and proximity data, wherein the proximity data comprises received signal strength indication (RSSI) data.

15. The control system of claim 12, wherein determining to move the client device to the micro cell is based on a RSSI threshold associated with the client device, wherein the RSSI threshold represents an outer bound of the micro cell for the client device to be located within a coverage area of the micro cell.

16. A network device comprising:
   a body;
   a macro radio disposed on the body and coupled to a first antenna configured to establish a macro cell;
   a micro radio disposed on the body and coupled to a second antenna configured to establish a micro cell, wherein a coverage area of the macro cell is spatially larger than a coverage area of the micro cell and encloses the coverage area of the micro cell; and
   a control system configured to:
      associate a client device to a first cell selected from one of the macro cell and the micro cell;
      determine a load associated with the macro radio and a load associated with the micro radio; and
      perform an action to move the client device to a second cell selected from the other of the macro cell and the micro cell, wherein moving the client device is based on proximity data of the client device and the load associated with the macro radio and the load associated with the micro radio.

17. The network device of claim 16, wherein the action further comprises:
   identifying all BSSID information for radios within range of the client device;
   providing, to the client device, a 802.11v BSS transition request comprising only BSSID information for the first cell; and
   instructing the client device to associate with the first cell based on the 802.11v BSS transition request.

18. The network device of claim 16, wherein moving the client device is based on client device data, wherein the client device data comprises at least one of: upload data, download data, connection time data to the macro radio, and the proximity data, wherein the proximity data comprises received signal strength indication (RSSI) data.

19. The network device of claim 16, wherein moving the client device is based on a received signal strength indication (RSSI) threshold associated with the client device, wherein the RSSI threshold represents an outer bound of the micro cell for the client device to be located within a coverage area to be serviced by the micro cell.

20. The network device of claim 16, wherein the action comprises:
   identifying all BSSID information for radios within range of the client device;
   providing, to the client device, a 802.11k neighbor list only comprising BSSID information for the first cell; and
   instructing the client device to associate with the first cell based on the 802.11k neighbor list.

* * * * *